UNITED STATES PATENT OFFICE.

JOHN RILEY AND CHARLES W. BISSELL, OF TROY, NEW YORK, ASSIGNORS TO CHARLES W. BISSELL, TERRANCE RILEY, AND MARY C. FRAZER.

IMPROVED COMPOSITION FOR COVERING STEAM-BOILERS, &c.

Specification forming part of Letters Patent No. 95,517, dated October 5, 1869.

*To all whom it may concern:*

Be it known that we, JOHN RILEY and CHARLES W. BISSELL, of the city of Troy, in the county of Rensselaer and State of New York, have invented a new and Improved Composition or Cement for the Covering or Coating of Steam-Boilers and Pipes or other devices for generating heated air, to prevent the radiation of heat and condensing of steam, and thereby economizing the use of fuel.

The nature of our invention consists in combining the following-named ingredients in such manner as to produce an adhesive paste or cement that will expand and contract according to the expansion or contraction of the boiler, pipe, or other device which it surrounds, without cracking, said composition or cement being a great non-conductor of heat.

To enable others skilled in the art to make and use our invention, we will proceed to describe the method of preparing it.

This composition or cement we in general compose, of a mixture of twelve (12) parts of pulp used in the manufacture of paper, five (5) parts of calcined plaster, two (2) parts of lime-putty, one (1) part of white sand, one (1) part of black lead, one (1) part of soap-stone; or, in lieu of calcined plaster, the same proportion of water-lime cement.

The paper-pulp is made in the following manner: Five hundred pounds of rye straw are put into a tub of lime-water, in whole bundles, and steamed eight hours longer than for making paper. They are then taken out, thoroughly washed, broken, and drained perfectly dry. Three hundred and fifty pounds of manilla rope are put into a tub of lime-water, and steamed same length of time, washed, broken, and drained same as straw. The straw and manilla are then put into a finishing-engine, to which are added seventy-five pounds of red clay, thirty pounds of alum, ten pounds of soda-ash, eight pounds of resin, eight pounds of asphaltum, fifteen pounds of sulphur, and drawn to a fiber instead of being cut, as used for paper-making.

The method of preparing is to mix the pulp, lime-putty, white sand, black lead, and soap-stone together with water, to about the consistency of ordinary mortar for plastering, work well together, then add the calcined plaster or water-lime cement, mix well, and it is ready to apply.

What we claim as our invention, and desire to secure by Letters Patent, is—

1. A composition or cement composed of "lime-putty," combined, as described, with the ingredients herein named or their equivalents, when used for the purposes specified.

2. A composition or cement composed of "paper-pulp," made in the manner set forth, combined, as described, with the ingredients herein named or their equivalents, when used for the purposes specified.

In testimony that we claim the above, we have hereunto subscribed our names in the presence of two witnesses.

JOHN RILEY.
CHARLES W. BISSELL.

Witnesses:
J. W. VOSSMERBAUMER,
WM. P. CONROY, Sr.